Figure 1:
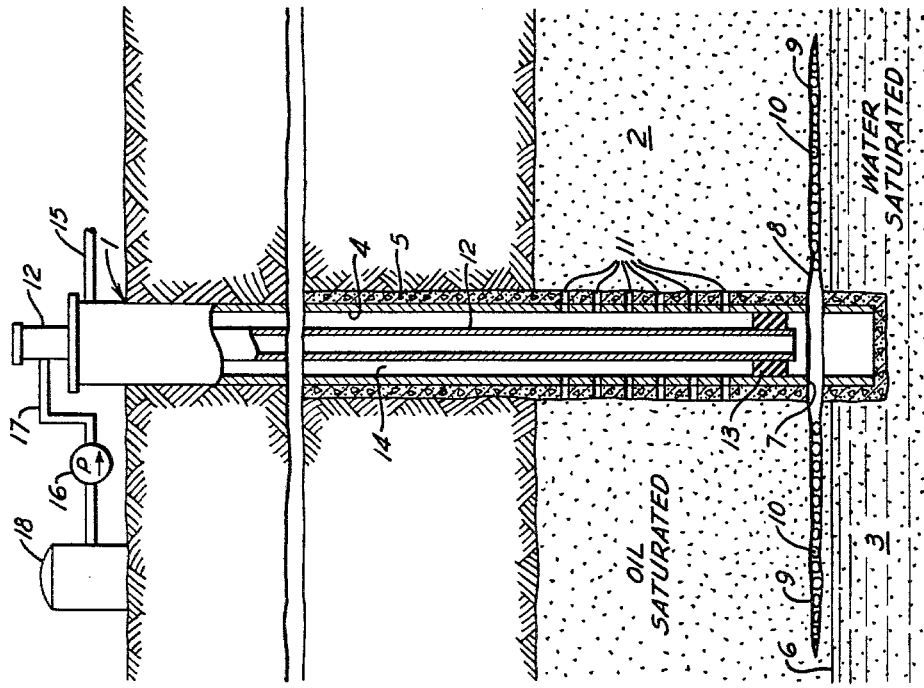

Jan. 11, 1966          J. PAPAILA          3,228,470
METHOD OF MITIGATING THE PRODUCTION OF UNDESIRABLE
GAS OR WATER IN OIL WELLS
Filed Dec. 31, 1962

INVENTOR.
JOHN PAPAILA
BY
ATTORNEY.

3,228,470
METHOD OF MITIGATING THE PRODUCTION OF UNDESIRABLE GAS OR WATER IN OIL WELLS
John Papaila, Apollo, Pa., assignor to Gulf Research & Development Company, Pittsburgh, Pa., a corporation of Delaware
Filed Dec. 31, 1962, Ser. No. 248,398
10 Claims. (Cl. 166—29)

This invention relates to the art of petroleum production from subterranean petroliferous reservoir rocks and in particular relates to a method for mitigating the production of undesired gas or water in the production of oil.

In petroleum-bearing reservoirs it is common to find the oil-saturated portions of the reservoir overlain by gas-saturated rock, and it is also common to find the oil-saturated portions of the reservoir underlain by water-saturated rock. Experience has shown that when the oil is produced through a well that penetrates a gas-oil reservoir to the oil-saturated portion of the reservoir, there is a tendency for gas to be drawn downward into the oil-producing well openings or perforations, so that a certain amount of gas in eventually produced with the oil. This is called "gas coning" because the gas is drawn down at the well to form an inverted cone-shaped interface between the oil and the gas. The gas is usually undesirable because it represents a waste of the reservoir's driving energy, and it also requires special surface equipment to separate the gas from the oil. Experience has also shown that when the oil is produced through a well that penetrates an oil-water reservoir to the oil-saturated portion of the reservoir, there is a tendency for water to be drawn upward into the oil-producing perforations, so that a certain amount of water may be produced with the oil. This is called water-coning because the water is drawn up at the well to form a cone-shaped interface between the water and the oil. The water is objectionable because it must be disposed of, and it also oftentimes presents a separation problem requiring special separators, emulsion breakers, and the like. Eventually so much water may be produced with the oil as to make further operation of the well uneconomical and the well is abandoned. Accordingly it is desirable to reduce as much as possible the production of gas and water with the oil. Both of these types of coning are known to be caused by dynamic effects arising from the flow of oil into the well.

A static method of avoiding coning has been proposed which comprises interposing an impermeable barrier between the gas or water and the oil-saturated layers of the reservoirs. Thus for example it has been proposed to make a substantially horizontal fracture in the formation between the layers and fill the fracture with impermeable cement, plastic, or the like. However, it has been found that because of the irregularities of such a fracture the barrier is not completely impermeable, but gaps or voids remain through which the undesirable fluid finds access to the oil entering the well. Furthermore, the best sealing agents, e.g. plastics, are very expensive. Moreover, once formed in the formation, such a barrier cannot be removed in the event that it should form an impediment to the production of oil. Accordingly such barriers have many disadvantages and leave much to be desired.

A dynamic method of avoiding coning has been proposed which comprises injecting oil at a zone of the well bore intermediate the oil and the gas or water. This procedure requires substantial pumping equipment and the expenditure of large amounts of power, and suffers from the serious disadvantage that it does not extend far from the well bore, i.e., it is ineffective in reducing coning except close to the well bore, so that in a short time the cone simply enlarges and works around the flow of injected oil. Another dynamic method that has been proposed is to withdraw the undesirable fluid at a high rate compared to the oil withdrawal rate so as to effect a reversal of the coning tendency. However, this is undesirable in the case of a gas-oil reservoir because it quickly lowers the formation pressure, and in the case of an oil-water reservoir it becomes prohibitively expensive to dispose of the large quantities of water withdrawn from the formation. Accordingly, these heretofore known types of dynamic methods of controlling gas and water coning have many disadvantages.

It is an object of this invention to provide an improved method for mitigating the production of gas along with oil.

It is another object of this invention to provide an improved method for mitigating the production of water along with oil.

A further object of this invention is to provide an improved dynamic method of reducing the tendency for gas-coning or water-coning in an oil well.

Figure 2:
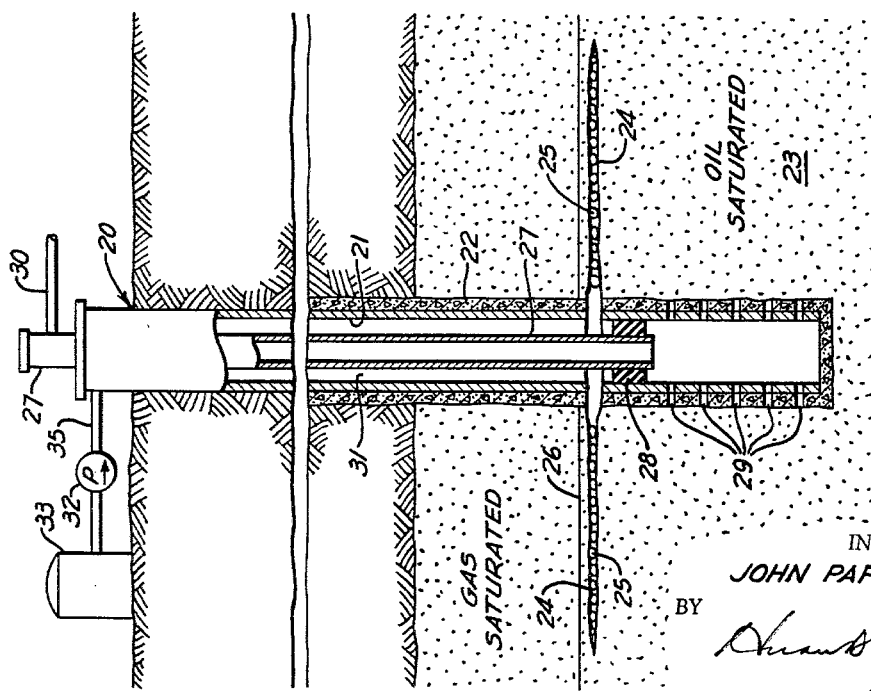

The method of this invention is described in the following specification of which the drawings form a part, and in which FIGURE 1 is a diagrammatic cross-section of a well illustrating the application of the invention to reduce water-coning in an oil well, and FIGURE 2 is a cross-section of a well illustrating application of the invention to reduce gas-coning in an oil well.

In accordance with this invention for preventing gas-coning a fracture is created proximately below the gas-oil contact and the fracture is propped in conventional manner. A fluid-loss reducing agent is deposited on the faces of the fracture. The oil well is perforated for oil production below the fracture. Tubing is run into the well through a packer which is set to provide a seal between the tubing and the casing at a depth intermediate the fracture and the oil perforations. The annular space about the tubing is thus placed in communication with the fracture. During the period of oil production a fluid is continuously injected through the annular space and into the fracture under low-fluid-loss conditions. The injection pressure is greater than the existing formation pressure but less than the fracturing pressure. Because of the low fluid-loss conditions prevailing in the fracture only a small outward flow of fluid will occur. There will thus be created on both sides of the fracture and a short distance beyond the outer periphery of the fracture a small fluid flow away from the fracture. This fluid flow provides a pressure gradient which over the large areal extent of the fracture effectively shields the overlying gas from the dynamic effects of the underlying oil flow into the well perforations. Inasmuch as the gas is thus shielded from the dynamic action responsible for gas-coning, no gas-coning takes place. In an analogous manner according to this invention, water-coning is prevented by fracturing the formation proximately above the oil-water contact. The fracture is propped and a fluid-loss-reducing agent is deposited on the faces of the fracture. The well is perforated for oil production above the fracture. Tubing is set in the well and sealed against the casing by a packer located intermediate the fracture and the oil perforations. During the period of oil production a fluid is continuously pumped through the tubing and into the fracture under low fluid-loss conditions at a pressure greater than the existing formation pressure but less than the fracturing pressure, and the outward flow of this fluid sets up a pressure gradient on both sides and at the end of the fracture which forms an effective shield of extensive area that protects the underlying water from the dynamic effects of the overlying oil flow into the oil perforations, thereby preventing the tendency for water-coning to take place.

Referring first to FIGURE 1 there is shown a well 1 penetrating the earth and completed in the oil-bearing formation 2. In FIGURE 1 the oil is indicated as being underlain by the water-saturated portion 3 of the formation 2. The well 1 is provided with casing 4 cemented as indicated at 5. The oil-water contact is indicated by the line 6, and its depth is determined by conventional well logging methods. In the oil region proximately above the oil-water contact 6 the casing and cement are cut as indicated at 7 and the formation is notched as indicated at 8. By means of the well-known single-entry fracture technique a substantially horizontal fracture 9 is created at the notch 8. The fracture 9 is propped with conventional propping agents indicated in FIGURE 1 by particles 10. The fracturing pressure is noted during the fracturing operation. It is preferred to produce a propped fracture of relatively large radius around the well inasmuch as the degree of protection provided against water-coning will be improved with a large radius fracture. In the course of the fracturing operation a fluid-loss-reducing additive is mixed with the fracturing fluid and the fluid-loss-reducing agent is deposited on the two faces of the fracture. Subsequently the fracturing pressure is released and the fracture is held open by the propping material 10. Flow from the formation into the fracture is prevented by maintaining adequate pressure on the well in order to prevent back flow and to maintain the fluid-loss-agent in place on the faces of the fracture. The well is perforated in the oil-producing interval as indicated by perforations 11. Formation pressure is determined in conventional manner as by means of a bottom-hole pressure gauge (not shown).

Tubing 12 is then installed in the well and equipped at its lower end with a packer 13 that provides a seal between the tubing 12 and the casing 4. The packer 13 is set just above the casing cut 7 (which communicates with the fracture 9) and below the perforations 11 above the fracture. There is thus provided a channel through the tubing 12 to the fracture 9, together with a separate channel from the oil-bearing formation through the perforations 11, through the annular space 14, and the oil delivery connection 15.

A pump 16 is connected to the tubing 12 by means of pipe 17. Pump 16 continuously injects fluid from a fluid supply 18 into the fracture 9 through the tubing 12 at a pressure which is lower than the fracturing pressure but which exceeds the formation pressure. The injected fluid is of a composition that does not deteriorate the fluid-loss-reducing agent on the fracture faces in order that the low-fluid-loss condition be maintained. Either aqueous or oil-base fluids may be injected, although the latter are preferred. Inasmuch as a low-fluid-loss condition exists at the fracture faces very little fluid will flow into the formation from the fracture 9. Despite the fact that there will be very little fluid flow, there will nevertheless be created on both sides of the fracture 9 and around the outer periphery thereof a continuous pressure gradient, the pressure being relatively high in the fracture 9 and falling off rapidly on both sides and away from the end of the fracture 9. The pressure gradient is upward everywhere on the upper surface of the fracture, and downward everywhere on the lower surface of the fracture, and radially outward around the outer periphery of the fracture. The pressure gradient is substantially the same in all of these regions since only a small pressure differential is required for the small amount of flow in the fracture itself. The water in the region 3 of the formation is thus continuously shielded by this pressure gradient over a large areal extent thus protecting the water from the pressure gradient arising from flow of the overlying oil into the perforations 11, that is to say the water in formation 3 is subjected to the pressure gradient arising from the flow of the fluid pumped into the fracture 9 instead of that due to oil flow into perforations 11. The shielding effect of the pressure gradient generated just above the oil-water contact 6 by flow from the fracture 9 prevents the water below the fracture from being subjected to the pressure gradient generated by flow of oil into the well above the fracture. Due to the low-fluid-loss condition at the faces of the fracture 9, only a small volume of fluid from tank 18 is actually pumped thus requiring little power to be expended and it is economical to continuously inject such fluid. Oil may thus be produced from the oil-bearing formation 2 through the perforations 11, annular space 14, and connection 15 without making the dynamic effects of this oil flow felt in the water-saturated part 3 of the reservoir below the fracture 9.

FIGURE 2 illustrates the manner in which this invention is applied to prevent gas-coning at the gas-oil contact of a well. FIGURE 2 indicates the well 20 equipped with casing 21 cemented at 22, the well being completed in the oil-producing formation 23. A propped fracture 24 is created in the oil-saturated formation 23 by conventional fracturing techniques proximately below the gas-oil contact 26. The fracturing fluid carries propping particles 25 into the fracture. The fracturing pressure is noted during the fracturing operation. In the course of the fracturing operation a fluid-loss-reducing additive is mixed with the fracturing fluid and the fluid-loss-reducing agent is deposited on the two faces of the fracture. When the fracturing pressure is released care is taken to maintain adequate pressure on the well in order to prevent back flow and to hold the fluid-loss-agent in place on the faces of the fracture. Tubing 27 is then installed in the well and sealed against the casing 21 by means of a packer 28 located below the fracture 24. The well is perforated below the packer 28 through the oil-saturated interval in order to produce the oil through perforations 29. In this manner oil production from the formation 23 may proceed in normal manner through the perforations 29 and tubing 27, and be delivered through connection 30. The annular space 31 of the well communicates with the fracture 24 and is connected through pipe 35 with a pump 32 that continuously injects fluid from tank 33 under pressure to the annular space 31 and fracture 24. The fluid employed is of a composition that does not deteriorate the fluid-loss reducing agent on the fracture faces in order that the low fluid-loss conditions in the fracture be maintained. Either aqueous or oil-base type fluids may be injected, the latter being preferred. The injection pressure is less than the fracturing pressure but larger than the existing formation pressure. The resultant pressure gradient both upward, downward, and outward from the fracture 24 effectively shields the gas overlying the fracture 24 from the dynamic effects of the oil flow into the perforations 29. The fracture 24 is made to have a substantial radius in order to provide a shield of substantial area around the well. The dynamic effect of the oil flow into perforations 29 decreases radially away from the borehole and is insignificent at a distance equal to the radius of a normal fracture. It is evident that the gas overlying the fracture 24 is thus effectively shielded from the dynamic effect of the underlying oil flow into perforations 29, thereby avoiding the effects of gas-coning.

In the operation of this invention the fluid continuously injected into the fracture is preferred to be of the oil-base type in order that the filtrate that passes through the low fluid-loss layer on the fracture faces be compatible with the oil produced. Some of the fluid injected into the fracture 9 or 24 will find its way through perforations 11 or 29 into the produced oil stream and accordingly the use of an oil-base fluid is preferred. However, inasmuch as only a small quantity of fluid actually leaves the fracture 9 or 24 no serious problem is encountered through the use of a properly designed water-base fluid, and these are oftentimes cheaper and are in all ways just as effective for purposes of this invention as are oil-base fluids.

In order to accurately place the fracture 9 just above the oil-water contact, or the fracture 24 just below the gas-oil contact, these respective contacts must be accurately located preferably through the use of conventional logging techniques while the well is shut-in. The fracture is then produced at the desired point by the use of the well-known so-called single-entry fracture control method.

While the invention has been described as applied to newly completed wells, it may also be applied to wells in which water-coning or gas-coning has already occurred. In such event it is preferred to place the fracture at or even somewhat below the intersection of the water-cone with the well bore. A fracture of normal size will have substantial radius about the well bore. The fracture will truncate the upper part of the cone and the continuous flow of fluid from pump 16 injected into the fracture will effectively shield the water-bearing part of the formation below the fracture from the dynamic effects of oil flow above the fracture. Similarly when the invention is applied to an oil well in which gas-coning has occurred, the fracture 24 may be located at or even slightly above the point at which the gas cone intersects the well bore so that the fracture 24 will cut off the lower part of the gas cone. The continuous flow of fluid from pump 32 into the fracture will effectively shield the gas above the fracture 24 from the dynamic effects of the oil flow into the producing perforations 29 below the fracture.

One type of aqueous low fluid-loss fluid that may be employed in this invention is that taught by U.S. Patent 3,022,248, and one type of oil-base low fluid-loss fluid that may be used is taught by U.S. Patent 3,046,222. These fluids are mentioned by way of example only and other equivalent low fluid-loss fluids, preferably of the oil-base type, may be employed during the fracturing operation to impart low fluid-loss conditions to the fracture faces. In this invention the agent that imparts the low fluid-loss condition to the fracture is preferably inorganic in nature so that it is not broken down by bacterial action. However, in the event that the fluid-loss-reducing agent in the fracture deteriorates for any reason and excessive fluid flow from the fracture into the formation, the low-fluid-loss condition can be re-established by temporarily adding fluid-loss-reducing agent to the injected fluid until only a small flow again takes place. Such materials as ground silica or ground limestone are effective fluid-loss-reducing agents and these agents are also easily removed in the event that it should later become desirable to use the fracture for producing oil. Once an effective low-fluid-loss rate condition has been established in the fracture by the use of non-deteriorating agents, a heavy high-viscosity crude may be employed as the continuously injected fluid without further addition of fluid-loss additives. A small flow will be effective to maintain the pressure gradient that forms the shield of this invention. If the continuously injected fluid is a water-base fluid it is preferred to employ water from the formation being treated in order to insure that the filtrate will be compatible with the formation rock and not cause plugging by swelling of clays or other similar phenomena. It is also apparent that the shield formed by the pressure gradient directed outwardly from the fracture may be increased in areal extent at any time by simply applying fracturing pressure to increase the radius of the fracture and depositing propping agent and fluid-loss-reducing agent in the extended fracture. Thus, for example, if during the production history of the well the shape of the gas cone or water cone changes, it may be desirable to increase the radius of the shield and this may easily be accomplished at any time.

It is apparent from FIGURE 2 that no difficulty arises in installing a conventional oil-well pump in the tubing string 27 to lift oil produced through the perforation 29 if pumping is required. In the case of FIGURE 1 if it is desired to pump the oil entering the well through perforations 11, this may be accomplished by equipping the well with parallel strings of tubing one of which is tubing 12 leading to the fracture 9 and the other of which (not shown) communicates with the perforations 11 and is equipped with a conventional oil-well pump.

The invention has been described as it is applied to a well that produces oil through perforations 11 or 29. However, the invention can also be applied to a well that is producing from one or more fractures (not shown) in the oil-saturated interval, in which event the invention has a unique advantage. Consider for example FIGURE 1 in which the perforations 11 are replaced by horizontal fractures (not shown). As oil production proceeds and the oil is depleted, the level of the water-oil contact 6 gradually rises in the formation 2. Eventually the level of the water-oil contact 6 in the entire formation 2 rises above the shield effect of the fluid pumped into fracture 9 and water then begins to appear at the lowermost oil-producing fracture. When this occurs, the facture 9 may be plugged off and the packer 13 is moved to be proximately above the lowermost oil-producing fracture. The lowermost oil-producing fracture is then employed as the fluid injection shield in the same manner in which the fracture 9 was previously used. The production fracture is first treated by injecting a fluid that carries fluid-loss-reducing agent which is thereby deposited on the faces of the old production fracture so as to adapt it to a fluid injection fracture having low fluid-loss conditions. Upon continuously thereafter injecting fluid as herein described this fracture becomes a new shield. Thus water-coning is again avoided until such time as the water-oil contact of the entire reservoir again rises to cover the new shielding fracture whereupon the next upward fracture is so employed. Thus the entire reservoir can be produced in stages without the incidence of water-coning at any time.

Similarly in the case of FIGURE 2, the well 20 may have fractures (not shown) in the producing interval 23 instead of the perforations 29 shown. As the oil is produced, the gas cap over the entire reservoir expands, whereupon the gas-oil contact 26 gradually falls. Eventually the gas-oil contact falls so low as to be below the shielding effect of pressurized fracture 24, whereupon gas begins to enter the uppermost oil-producing fracture. The fracture 24 may then be cemented off and the packer 28 moved to below the level of the uppermost producing fracture, and what was formerly the uppermost oil-producing fracture is converted into a shield by depositing therein the fluid-loss-reducing agent as was previously done in fracture 24. Upon injecting fluid according to this invention the new shielding fracture will prevent gas-coning until such time as the gas-oil contact of the entire reservoir again falls therebelow at which time the next lower producing fracture is converted into a shield and so on. In this manner the entire reservoir can be produced without gas-coning having taken place at any time during the production history.

Furthermore, if after the primary recovery stages of the reservoir have been completed, it is desired to apply secondary recovery procedures, any of the fractures used for shielding according to this invention may be easily reopened and reused for either production or for the injection of flooding fluid by reducing the well pressure to a low value so that formation fluids flow into the fracture for a short time to clean out the fluid-loss-reducing material, after which the fracture may be employed for other purposes.

What I claim as my invention is:

1. A method of preventing entry of a foreign fluid into a well producing a desired fluid from a subterranean rock formation which comprises hydraulically creating and propping a fracture of substantial radius about the well in a region of the formation intermediate the source of the foreign fluid and the source of the desired fluid, depositing a fluid-loss-reducing agent on the faces of said fracture thereby providing restriction to fluid flow from said fracture to the formation abutting the faces of said fracture, providing in said well from the earth's surface to said fracture a first flow channel, said first flow channel being isolated from a second flow channel through which the desired fluid is to be produced, subsequently during production of the desired fluid through said second flow channel substantially continuously injecting a fluid into said fracture via said first flow channel under said restricted flow conditions at a pressure greater than the formation pressure but less than the fracturing pressure.

2. A method of preventing entry of a foreign fluid into a well producing a desired fluid from a subterranean rock formation which comprises hydraulically creating and propping a fracture of substantial radius about the well in a region of the formation intermediate the source of the foreign fluid and the source of the desired fluid, depositing a fluid-loss-reducing agent on the faces of said fracture thereby providing restriction to fluid flow from said fracture to the formation abutting the faces of said fracture, providing in said well from the earth's surface to said fracture a first flow channel, said first flow channel being isolated from a second flow channel through which the desired fluid is to be produced, subsequently during production of the desired fluid through said second flow channel substantially continuously injecting a fluid into said fracture via said first flow channel under said restricted flow conditions at a pressure greater than the formation pressure but less than the fracturing pressure, and said injected fluid having a filtrate that is compatible with said desired fluid.

3. A method of controlling water-coning in an oil well that penetrates an oil-saturated subterranean rock formation underlain by water-saturated formation in contact therewith which comprises.

creating a fracture in the oil-saturated rock formation proximately above the water-oil contact by the application of hydraulic fracturing pressure thereto, injecting a propping agent into said fracture whereby the fracture will remain open after said hydraulic fracturing pressure is released, depositing fluid-loss-reducing agent on the faces of said fracture thereby providing restriction to fluid flow from said fracture to the formation abutting the faces of said fracture, providing in said well from the earth's surface to said fracture a first flow channel, said first flow channel being isolated from a second flow channel through which the desired fluid is to be produced, subsequently during production of oil from the oil-saturated formation through said second flow channel continuously injecting a fluid into said fracture via said first flow channel under said restricted flow conditions at a pressure greater than the formation pressure but less than the previously applied fracturing pressure.

4. A method of controlling gas-coning in an oil well that penetrates an oil-saturated subterranean rock formation overlain by gas-saturated formation in contact therewith which comprises creating a fracture in the oil-saturated rock formation proximately below the gas-oil contact by the application of hydraulic fracturing pressure thereto, injecting a propping agent into said fracture whereby the fracture will remain open after said hydraulic fracturing pressure is released, depositing a fluid-loss-reducing agent on the faces of said fracture thereby providing restriction to fluid flow from said fracture to the formation abutting the faces of said fracture, providing in said well from the earth's surface to said fracture a first flow channel, said first flow channel being isolated from a second flow channel through which the desired fluid is to be produced, subsequently during production of oil from the oil-saturated formation through said second flow channel continuously injecting a fluid into said fracture via said first flow channel under said restricted flow conditions at a pressure greater than the formation pressure but less than the previously applied fracturing pressure.

5. The method of claim 3 wherein the injected fluid is an oil-base fluid.

6. The method of claim 3 wherein the injected fluid is a water-base fluid.

7. The method of claim 4 wherein the injected fluid is an oil-base fluid.

8. A method of producing oil from a well penetrating an oil-saturated subterranean rock formation underlain by water-saturated formation in contact therewith which comprises locating the water-oil contact in the well, hydraulically fracturing the oil-saturated formation proximately above the water-oil contact, injecting a propping agent into said fracture whereby said fracture will remain open after the hydraulic fracturing pressure is released, depositing a fluid-loss-reducing agent on the faces of said fracture thereby providing restriction to fluid flow from said fracture to the formation abutting the faces of said fracture, providing in said well from the earth's surface to said fracture a first flow channel, said first flow channel being isolated from a second flow channel through which the oil is to be produced, producing oil from the oil-saturated formation above said fracture through said second flow channel, during production of oil from the oil-saturated formation through said second flow channel continuously injecting a fluid into said fracture via said first flow channel under said restricted flow conditions at a pressure greater than the formation pressure but less than the previously applied fracturing pressure until water appears entrained in the produced oil, repeating the steps of fracturing and propping the formation proximately above the point of entry of water into the produced oil and depositing a fluid-loss-reducing agent on the faces of said last-named fracture, modifying said first flow channel to communicate with said last-named fracture instead of said first-named fracture, producing oil through said second flow channel from above said last-named fracture, during production of oil through said second flow channel continuously injecting a fluid via said modified first flow channel into said last-named fracture under said restricted flow conditions at a pressure greater than the formation pressure but less than the previously applied fracturing pressure until water again appears entrained in the produced oil, and repeating each and every one of said steps until oil has been depleted from substantially the entire thickness of oil-saturated formation.

9. A method of producing oil from a well penetrating an oil-saturated subterranean rock formation overlain by gas-saturated formation in contact therewith which comprises locating the gas-oil contact in the well, hydraulically fracturing the oil-saturated formation proximately below the gas-oil contact, injecting a propping agent into said fracture whereby said fracture will remain open after the hydraulic fracturing pressure is released, depositing a fluid-loss-reducing agent on the faces of said fracture thereby providing restriction to fluid flow from said fracture to the formation abutting the faces of said fracture, providing in said well from the earth's surface to said fracture a first flow channel, said first flow channel being isolated from a second flow channel through which the oil is to be produced, producing oil from the oil-saturated formation below said fracture through said second flow channel, during production of oil from the oil-saturated formation through said second flow channel continuously injecting a fluid into said fracture via said first flow channel under said restricted flow conditions at a pressure greater than the formation pressure but less than the previously applied fracturing pressure until gas appears entrained in the produced oil, repeating the steps of fracturing and propping the formation proximately below the point of entry of gas into the produced oil and depositing a fluid-loss-reducing agent on the faces of said last-named fracture, modifying said first flow channel to communicate with said last-named fracture instead of said first-named fracture, producing oil through said second flow channel from below said last-named fracture, during production of oil through said second flow channel continuously injecting a fluid via said modified first flow channel into said last-named fracture under said restricted flow conditions at a pressure greater than the formation pressure but less than the previously applied fracturing pressure until gas again appears entrained in the produced oil, and repeating each and every one of said steps until oil has been depleted from substantially the entire thickness of oil-saturated formation.

10. A method of preventing entry of a foreign fluid into a well producing a desired fluid from a subterranean rock formation which comprises fracturing the formation adjacent the well in a region intermediate the source of the foreign fluid and the source of the desired fluid, depositing a fluid-loss-reducing agent on the faces of said fracture thereby restricting fluid flow from said fracture to the formation abutting the faces of said fracture, injecting a propping agent into said fracture, providing in said well from the earth's surface to said fracture a first flow channel, said first flow channel being isolated from a second flow channel through which the desired fluid is to be produced, and subsequently during production of the desired fluid through said second flow channel continuously injecting a fluid into said fracture via said first flow channel under said restricted flow conditions at a pressure greater than the formation pressure but less than the fracturing pressure.

References Cited by the Examiner

UNITED STATES PATENTS

| | | | |
|---|---|---|---|
| 2,368,424 | 1/1945 | Reistle | 166—42.1 |
| 2,821,255 | 1/1958 | Spearow | 166—42.1 |
| 3,058,909 | 10/1962 | Kern | 166—42.1 |
| 3,120,265 | 2/1964 | Allen | 166—42.1 |

CHARLES E. O'CONNELL, *Primary Examiner.*